United States Patent
Hsiao et al.

(10) Patent No.: US 10,345,887 B2
(45) Date of Patent: Jul. 9, 2019

(54) ADAPTIVE OPTIMIZATION OF LOW POWER STRATEGIES

(71) Applicant: MEDIATEK INC., Hsinchu (TW)

(72) Inventors: Kuo-SU Hsiao, Hsinchu County (TW); Yen-Lin Lee, Hsinchu County (TW); Shih-Yen Chiu, Hsinchu (TW); Jia-Ming Chen, Hsinchu County (TW); Mark Shane Peng, Hsinchu County (TW); Ya-Ting Chang, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/148,031

(22) Filed: May 6, 2016

(65) Prior Publication Data
US 2017/0322616 A1 Nov. 9, 2017

(51) Int. Cl.
*G06F 1/32* (2019.01)
*G06F 1/3287* (2019.01)
(Continued)

(52) U.S. Cl.
CPC ............ *G06F 1/3287* (2013.01); *G06F 1/206* (2013.01); *G06F 1/324* (2013.01); *G06F 1/3206* (2013.01);
(Continued)

(58) Field of Classification Search
CPC ........ G06F 1/3287; G06F 1/324; G06F 1/329; G06F 1/3296
See application file for complete search history.

(56) References Cited

U.S. PATENT DOCUMENTS

| 7,861,099 | B2 * | 12/2010 | Theocharous | ........ G06F 1/3203 713/300 |
| 9,372,524 | B2 * | 6/2016 | Sistla | .................... G06F 1/3228 |

(Continued)

FOREIGN PATENT DOCUMENTS

| CN | 103678247 A | 8/2012 |
| CN | 105556419 A | 6/2013 |

OTHER PUBLICATIONS

EPO, Search Report for the EP patent application 16177984.8 dated Jun. 8, 2017 (9 pages).
(Continued)

*Primary Examiner* — Stefan Stoynov
(74) *Attorney, Agent, or Firm* — Imperium Patent Works; Helen Mao

(57) ABSTRACT

Methods and apparatus are provided for adaptive optimization of low-power strategies. In one novel aspect, the device monitors one or more thermal-performance parameters and determines a plurality of operation scenarios for a plurality of corresponding low-power policies. Based on corresponding operation scenarios, the device selects corresponding low-power policy. The device applies different low-power strategy for temperature control based on low-power policies. Different low-power policy is applied to different low-power techniques, such as the DVFS, the CPU hot-plug, and the task migration. In another novel aspect, the device obtains one or more user-defined policy for each corresponding low-power technique. The selection of each low-power policy is further based on its corresponding user-defined policy. In one embodiment, the user-defined DVFS policy includes power policy, performance policy, and DVFS-balanced policy. The user-defined CPU hot-plug policy includes conservative policy, aggressive policy, and hot-plug-balanced policy. The user-defined task-migration
(Continued)

policy includes performance policy, and task-migration-balanced policy.

15 Claims, 5 Drawing Sheets

(51) Int. Cl.
G06F 1/324 (2019.01)
G06F 1/329 (2019.01)
G06F 1/3296 (2019.01)
G06F 1/20 (2006.01)
G06F 1/3206 (2019.01)
G06F 1/3228 (2019.01)
G06F 1/3234 (2019.01)
G06F 1/3293 (2019.01)

(52) U.S. Cl.
CPC ............ *G06F 1/329* (2013.01); *G06F 1/3228* (2013.01); *G06F 1/3243* (2013.01); *G06F 1/3293* (2013.01); *G06F 1/3296* (2013.01); *Y02D 10/122* (2018.01); *Y02D 10/126* (2018.01); *Y02D 10/152* (2018.01); *Y02D 10/16* (2018.01); *Y02D 10/171* (2018.01); *Y02D 10/172* (2018.01); *Y02D 10/24* (2018.01)

(56) References Cited

U.S. PATENT DOCUMENTS

| | | | |
|---|---|---|---|
| 2011/0106515 A1 | 5/2011 | Bhamidipaty et al. | 703/13 |
| 2011/0187733 A1 | 8/2011 | Sun et al. | 345/589 |
| 2012/0144217 A1 | 6/2012 | Sistla et al. | 713/300 |
| 2012/0179441 A1 | 7/2012 | Anderson et al. | 703/6 |
| 2013/0204921 A1 | 8/2013 | Diaz et al. | 709/202 |
| 2014/0068285 A1 | 3/2014 | Lee et al. | 713/300 |
| 2014/0365787 A1 | 12/2014 | Sagar et al. | 713/300 |
| 2016/0077576 A1* | 3/2016 | Karhu | G06F 1/3246 713/323 |

OTHER PUBLICATIONS

Taiwan IPO, office action for the TW patent application 106107918 (no English translation is available) dated Mar. 31, 2018 (6 pages).

Ayse Kivilcim Coskun, "Efficient thermal management for multiprocessor systems", Computer Science and Engineering of University of California, San Diego (Jan. 1, 2009) *Section 2.2.3*, *Section 2.2.5*, *Section 2.4*, *Section 2.4.1*, *Section 2.5.2*, *Section 5.1*.

SIPO, office action for the CN patent application 201611115298.6 (no English translation is available) dated Apr. 2, 2019 (8 pages).

* cited by examiner

ADAPTIVE OPTIMIZATION OF LOW POWER STRATEGIES

TECHNICAL FIELD

The disclosed embodiments relate generally to power/resource budget method, and, more particularly, to adaptive optimization for low power strategies.

BACKGROUND

With the rapid growth in mobile/wireless and other electronics devices, the battery life becomes an important factor in the success of such devices. At the same time, many advanced applications for these devices are becoming more and more popular. Such applications normally require high performance of components in the devices. Sustainable power is limited by the dissipation capability and thermal constraint. The device or semiconductor chips can malfunction if the temperature is too high. Thermal throttle methods are commonly used in the devices to prevent overheat problems due to the dissipation limitation. The traditional thermal throttling unnecessarily sacrifices the performance in order to maintain the temperature with the target temperature. In the traditional way, the device monitors the temperature and triggers power reduction if the temperature becomes higher than a threshold. If the power reduction is too fast, it results in noticeable performance degradation and affects overall device performance. The performance is limited by the sustainable power. If the power reduction is too slow, the temperature continues to rise before it goes down. Overheating will cause shortened lifespan of the chips or even cause permanent damage to the device.

Further, there are multiple ways to control the temperature, including Dynamic Voltage and Frequency Scaling (DVFS), CPU hot-plug, and task migration/cluster switch. In the current system, a single control policy controls different temperature methods. The single policy may fit one method but does not fit others. It results in reduced efficiency and/or sacrifice the system performance.

Furthermore, for each control technique, based on different user preferences and different operating scenarios, the control parameters vary as well. The single policy for all control techniques under any scenarios does not provide the most efficient way in many occasions.

Improvements and enhancements are needed for adaptive optimization for low power strategies.

SUMMARY

Methods and apparatus are provided for adaptive optimization of low power strategies. In one novel aspect, the device monitors one or more thermal-performance parameters and determines a plurality of operation scenarios for a plurality of corresponding low-power policies. Based on corresponding operation scenarios, the device then selects corresponding low-power policy, which applies to a corresponding low-power strategy. The device applies each low-power policy to its corresponding low-power strategy. In one embodiment, the low-power strategies/techniques include the DVFS, the CPU hot-plug, and the task migration. The thermal-performance parameters include a loading, a task-level parallelism (TLP), a number of CPU cores, and an operating frequency. In one embodiment, the device further obtains long-term and/or short-term average of the thermal-performance parameters. The device determines a plurality of operation scenarios further based on the long-term and/or short-term average of the thermal-performance parameters. In another embodiment, the device further obtains the number of CPU cores and determines the operating frequency based on the obtained number. In yet another embodiment, the device determines the number of operating CPU cores based on the TLP and the operating frequency. In one embodiment, the number of operating CPU cores is increased when the TLP is higher than a threshold. In another embodiment, when the operating frequency is higher than a predefined threshold, the evaluation cycle is shortened for adjusting the number of CPU cores.

In another novel aspect, the device obtains one or more user-defined policy for corresponding low-power strategy/technique. The selection of each low-power policy is further based on its corresponding user-defined policy. In one embodiment, the user-defined DVFS policy includes power policy, performance policy, and DVFS-balanced policy. The user-defined CPU hot-plug policy includes conservative policy, aggressive policy, and hot-plug-balanced policy. The user-defined task-migration policy includes performance policy, and task-migration-balanced policy.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
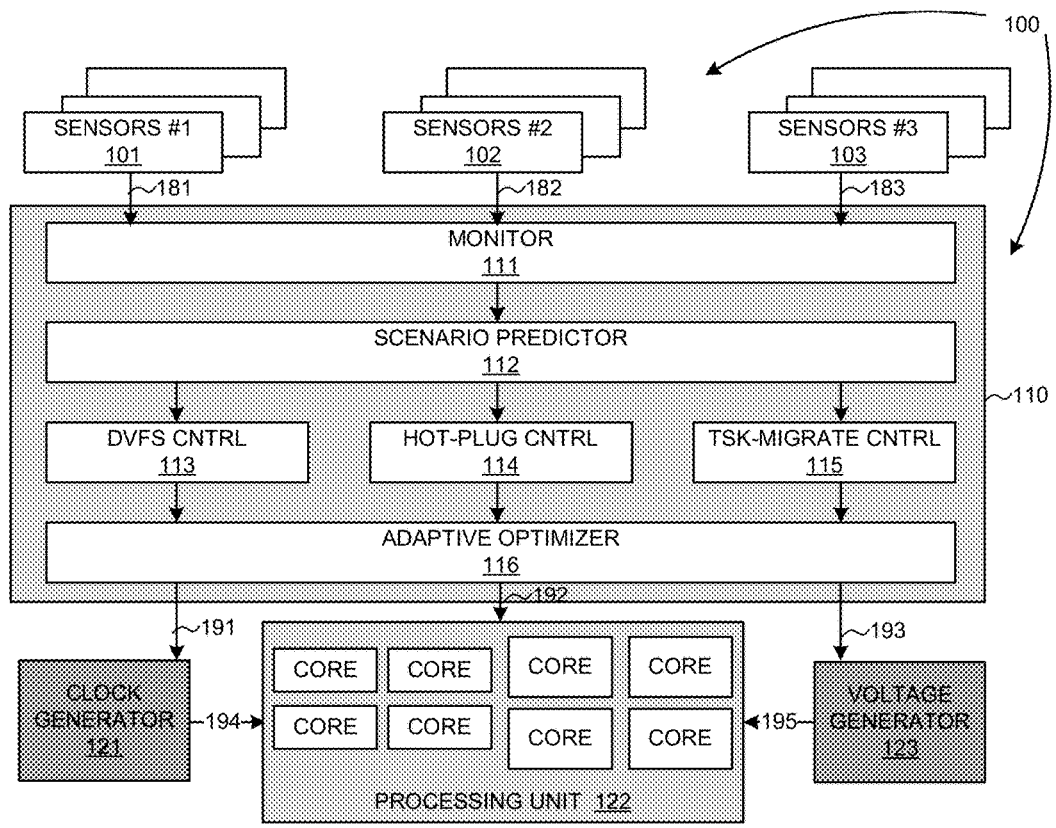
FIG. 1 shows simplified block diagrams of a device that performs adaptive optimization for low power strategies in accordance with embodiments of the current invention.

FIG. 1 shows simplified block diagrams of a device 100 that performs adaptive optimization for low power strategies in accordance with embodiments of the current invention. Device 100 may have one or more sets of sensors, such as sensor set 101, sensor set 102, and sensor set 103. Device 100 also includes a policy controller 110, a clock generator 121, a processing unit 122, and/or a voltage generator 123. The sensors sets monitor different power parameters. In one embodiment, sensor set 101 senses one or more load information of the system and sends load information 181 to policy controller 110. Sensor set 102 senses one or more clock information and sends clock information 182 to policy controller 110. Sensor set 103 senses task-scheduling information and sends task-scheduling information 183 to policy controller 110. In some other embodiments, policy controller 110 may receive above-mentioned information from another device other than the sets of sensors (ie. sensor set 101, sensor set 102, or sensor set 103), which should not be limited in this disclosure.

Policy controller 110 includes a monitor 111, a scenario predictor 112, an adaptive optimizer 116, and at least one of a DVFS controller 113, a hot-plug controller 114, and a task migrate controller 115. Clock generator 121 generates clock information for processor 122. Processing unit 122 includes one or more multi-core processors. Voltage generator 123 controls the levels of output voltage. To control effectively the temperature of Device 100, policy controller 110 sends clock control information 191 to clock generator 121. Based on the clock control information 191, clock generator 121 sends clock information 194 to processing unit 122. Policy controller 110 may control processing unit 122 through on/off control information 192. Policy controller 110 may send voltage control information 193 to voltage generator 123. Based on voltage control information 193, voltage generator 123 controls the operating voltage of processing unit 122 through control information 195.

In one embodiment, device 100 selects one or more low-power policies based on a determined operation scenario. The one or more low-power policies are applied to at least one of corresponding low-power strategies including the DVFS, the CPU hot-plug and the task migration. The DVFS strategy is a low-power strategy to leverage performance and power by dynamically adjusting clock frequency and clock voltage. One of the main issue for low-power policy of DVFS is to balance two competing objectives, which are maximizing the power saving and ensuring tight fine-grain performance. The CPU hot-plug strategy is a low-power strategy to leverage performance and power by employing one or more CPU cores. One of the main issues for low-power policy of the CPU hot-plug is when to turn on or turn off the one or more CPU cores. With more CPU cores turned on, the performance increases while the power efficiency decreases. Similarly, with less CPU cores turned on, the performance decreases while the power efficiency increases. The low-power policy needs to consider the performance and power overhead when turning on and off the CPU cores. The task migration is a low-power strategy to leverage performance and power in the HMP system. In a multi-core CPU system, there are some big cores with higher performance requiring higher power consumption. There are also some little cores with lower performance but lower power consumption. The task migration strategy can migrate different tasks between big cores and little cores. One of the main issues for low-power policy of the task migration is when to migrate to another cluster. The performance and power overhead during task migration needs to be considered too.

In one embodiment, DVFS controller 113, CPU hot-plug controller 114, and task-migration controller 115 receive operation scenario from scenario predictor 112. In one embodiment, each low-power controller has a corresponding operation scenario. Each controller selects a corresponding low-power policy based on the operation scenario. For example, DVFS controller 113 selects a best DVFS policy for the DVFS low-power strategy; CPU hot-plug controller 114 selects a best CPU hot-plug policy for CPU hot-plug low-power strategy; and task-migration controller 115 selects a best task-migration policy for the task-migration low-power strategy. The selected low-power policies for each low-power strategy are sent to adaptive optimizer 116. Adaptive optimizer 116 selects one or more low-power policies for one or more corresponding low-power strategy controller. In one embodiment, a subset of low-power strategies is selected while the other are not used. Adaptive optimizer 116 sends control information to clock generator 121, processor 122, and voltage generator 123 to apply the low-power strategies.

Figure 2:
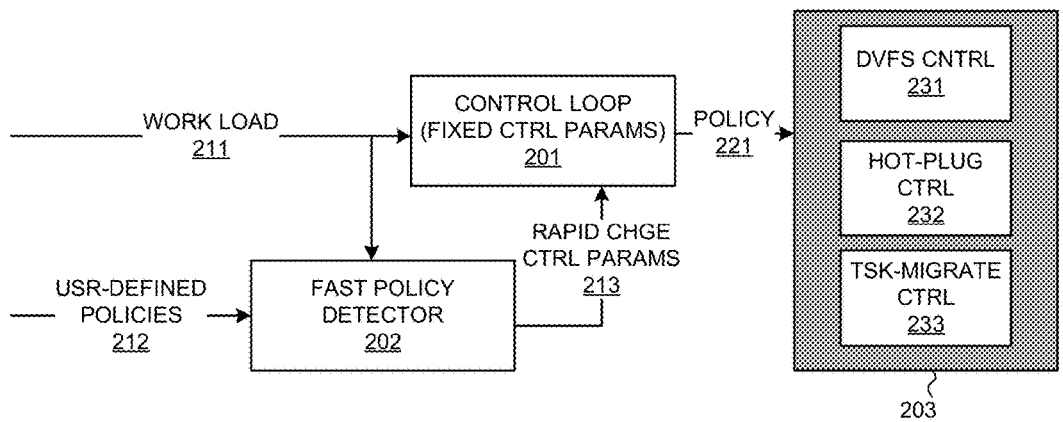
FIG. 2 illustrates an exemplary diagram of the temperature control loop with adaptive temperature control in accordance with embodiments of the current invention.

FIG. 2 illustrates an exemplary diagram of the low-power control unit with adaptive temperature control in accordance with embodiments of the current invention. The temperature control unit includes a control loop 201, a fast policy detector 202, and policy controllers 203. Control loop 201 adaptively controls the temperature such that the temperature is below the maximum allowable temperature limit. Control loop 201 takes workload 211 as an input. Control loop 201 generates one or more control policies based on workload 211 for policy controllers 203. Policy controllers 203 include a DVFS controller 231, a hot-plug controller 232, and a task-migration controller 233. Workload 211 includes thermal-performance parameters such as the number of running cores of the power source, the running frequency, the loading, the task-level parallelism (TLP), and any other power related parameter or combination thereof. In one embodiment, workload 211 is based on long-term average values of the one or more thermal-performance parameters. In another embodiment, workload 211 is based on short-term average values of the one or more thermal-performance parameters. In yet another embodiment, workload 211 is based on a combination of the short-term and the long-term average values of the one or more thermal-performance parameters. Information of workload 211 can be generated by hardware or software. Control loop 201 is configured with fixed parameters. Control loop 201 generates control policies based on workload 211. The fixed parameters include the maximum allowable temperature limit and performance related parameters.

In one novel aspect, control loop 201 takes additional rapid changing control parameters 213 as inputs and adaptively generates one or more control policies for at least one of corresponding control policy units. With additional parameters 213, control loop 201 can maximize the performance while controlling the temperature under a target temperature. In one embodiment, the temperature control unit also includes a fast policy detector 202. Fast policy detector 202 takes user-defined policies 212 and workload 211 as its inputs. Fast policy detector 202 generates rapid changing control parameters 213 for control loop 201. Rapid changing control parameters 213 include different user-defined policy preference for corresponding policy control techniques such as the DVFS, the CPU hot-plug, and the task migration. Control loop 201 generates different policies based on the fixed parameters and rapid changing control parameters 213. With dynamic parameters such as rapid changing control parameters 213, control loop 201 can obtain a better-defined scenario for power control because in addition to the general parameters, fine-grained information are available to make the decision. Further, different parameters can be used to generate control policies for different temperature control techniques. In one embodiment, control loop 201 also chooses one or more control techniques based on its inputs.

Figure 3:
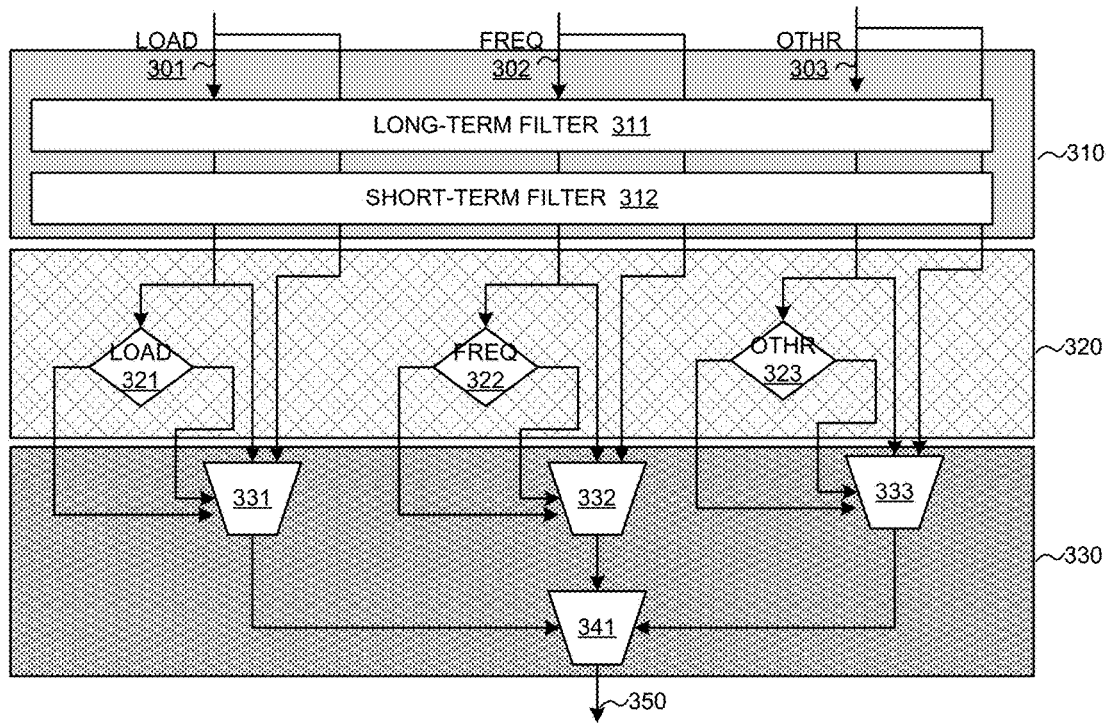
FIG. 3 illustrates an exemplary scenario analyzer using long-term and short-term average values of thermal-performance parameters in accordance with embodiments of the current invention.

FIG. 3 illustrates an exemplary scenario analyzer using long-term and short-term average values of thermal-performance parameters in accordance with embodiments of the current invention. The temperature control loop monitors and collects thermal-performance parameters such as the number of running cores of the power source, the running frequency, the loading, the task-level parallelism (TLP), and any other power related parameter or combination thereof. An operation scenario is predicted based on these parameters. In one embodiment, the control loop further obtains the long-term and short-term averages of the collected thermal-performance parameters. The collected parameters, the long-term average parameters, and the short-term average parameters) are used to select a set of best policy for power control such that the performance is maximized. The optimized analyzer includes a monitor 310, a scenario predictor 320, and an adaptive optimizer 330. The scenario analyzer monitors and collects inputs including performance/loading information 301, operating frequency information 302, and task scheduling information 303. In other embodiments, other thermal-performance parameters are also included to optimize the policy selection. Monitor 310 includes a long-term filter 311 and a short-term filter 312. Long-term filter 311 takes the inputs, such as performance/loading information 301, operating frequency information 302, and task scheduling information 303, and obtains long-term average for each of the collected parameters. Similarly, short-term filter 312 obtains short-term averages of corresponding parameters collected by monitor 310. Scenario predictor 320 includes one or more scenario generators for each corresponding policy controller including the DVFS controller, the CPU hot-plug controller, and the task-migration controller. Scenario predictor 320 includes a load-checking unit 321, a frequency-checking unit 322, and a task-schedule checking unit 323. In one embodiment, load-checking unit 321 determines whether the workload is heavy or light based on the load information. Load-checking unit 321 compares detected workload with a predefined threshold and determines whether the current workload is heavy or light. In one embodiment, the detected workload is the measured loading information.

Similarly, frequency-checking unit 322 determines whether the operating frequency is heavy or light based on the frequency information. Frequency-checking unit 322 compares detected operating frequency with a predefined threshold and determines whether the current operating frequency is heavy or light. In one embodiment, the detected workload is the measured operating frequency information. Similarly, task-schedule checking unit 323 determines whether the task scheduling is heavy or light based on the task scheduling information. Task scheduling checking unit 323 compares detected task scheduling with a predefined threshold and determines whether the current task scheduling is heavy or light. In one embodiment, the detected task scheduling is the measured task scheduling information.

Adaptive optimizer 330 includes a load-policy selector 331, a frequency-policy selector 332, a task-schedule policy selector unit 333, and a policy selector 341. Load-policy selector 331 selects a load policy based on the determined heavy or light load information, the long-term load average, and the short-term load average. Similarly, frequency-policy selector 332 selects a frequency policy based on the determined heavy or light frequency information, the long-term frequency average, and the short-term frequency average. Similarly, scheduling-policy selector 333 selects a task-scheduling policy based on the determined heavy or light frequency information, the long-term task scheduling average, and the short-term task scheduling average. The selected policies from selectors 331, 332 and 333 are sent to policy selector 341. Policy selector 341 selects a best policy 350 based on the inputs. In one embodiment, the selected best policy applies one or more policy controllers. In another embodiment, one or more policies are selected for each corresponding policy controllers.

Figure 4:
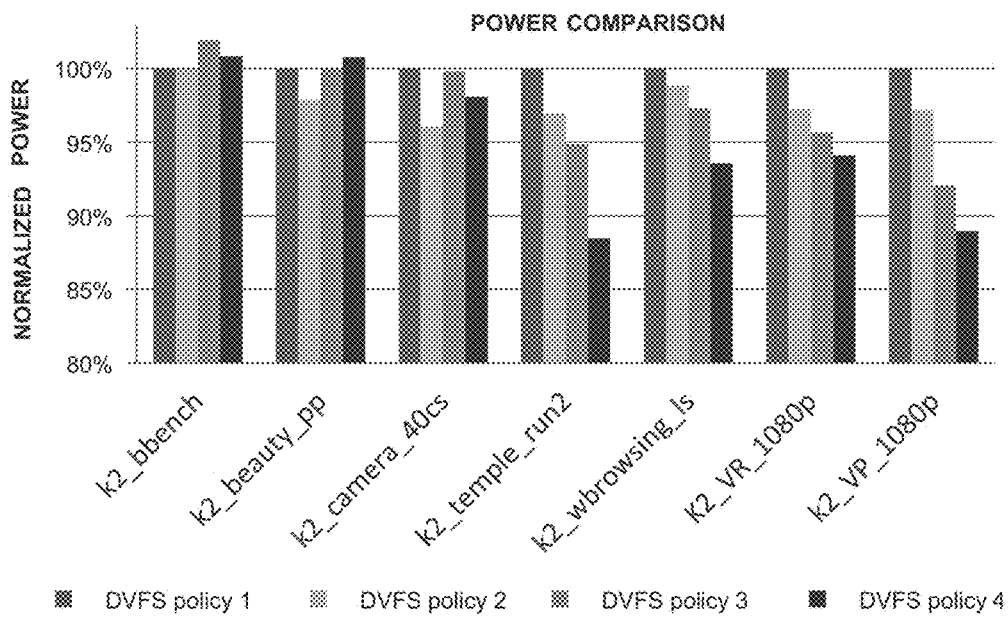
FIG. 4 illustrates an exemplary diagram of power comparison for different chip using different control policy in accordance with embodiments of the current invention.

FIG. 4 illustrates an exemplary diagram of power comparison for different chip using different control policy in accordance with embodiments of the current invention. In one novel aspect, different control policies should be applied in different scenario to achieve a better power consumption. As shown, four different types of DVFS control policies are applied under different scenarios. A DVFS policy involves a two-part power control. The first part is to increase the power when determined the temperature is under control. The second part is to decrease the power such that the temperature can stay below the maximum allowable limit. Different policies are designed to trigger the first part and the second party. As an example, a DVFS policy #1 is designed to trigger the increasing power with lower level of standard, while decreasing power with higher level of standard. Similarly, a DVFS policy #2 is designed to trigger the increasing power with lower level of standard while decreasing power with lower level of standard. A DVFS policy #3 is designed to trigger the increasing power with higher level of standard while decreasing power with higher level of standard. A DVFS policy #4 is designed to trigger the increasing power with higher level of standard while decreasing power with lower level of standard. In one embodiment, the level of standard for increasing or decreasing the power can be adjusted by changing value of the triggering temperature for power increase or decrease. For example, the standard of increasing power is set higher by using a higher power-increase triggering temperature, and the standard of increasing power is set lower by using a lower power-increase triggering temperature. Similarly, the standard of decreasing power is set higher by using a lower power-decrease triggering temperature, and the standard of decreasing power is set lower by using a higher power-decrease triggering temperature.

FIG. 4 illustrates the power consumption applying four different DVFS policies for different applications. As shown, under different scenarios/applications, different DVFS policies result in different power consumption. For example, for K2_beaty_pp and K2_camera_40cs application, DVFS policy #2 yields the lowers power consumption. However, for K2_temple_run2 k2_wbrowsing_ls, K2_VR_1080p, and K2_VP_1080p applications, DVFS policy #4 yields the lowest power consumption. In one novel aspect, different control policies apply based on different scenario such that the performance can be optimized while keeping the temperature under the maximum allowable limit.

Figure 5A:
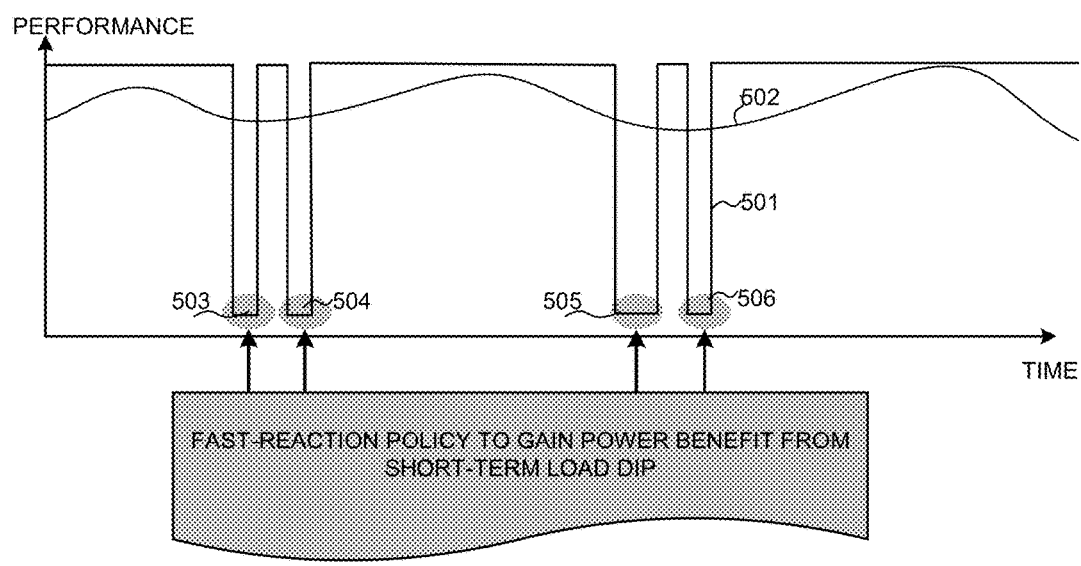
FIG. 5A illustrates an exemplary diagram of power control with automatically recognition of short-term low loading in accordance with embodiments of the current invention.
Figure 5B:
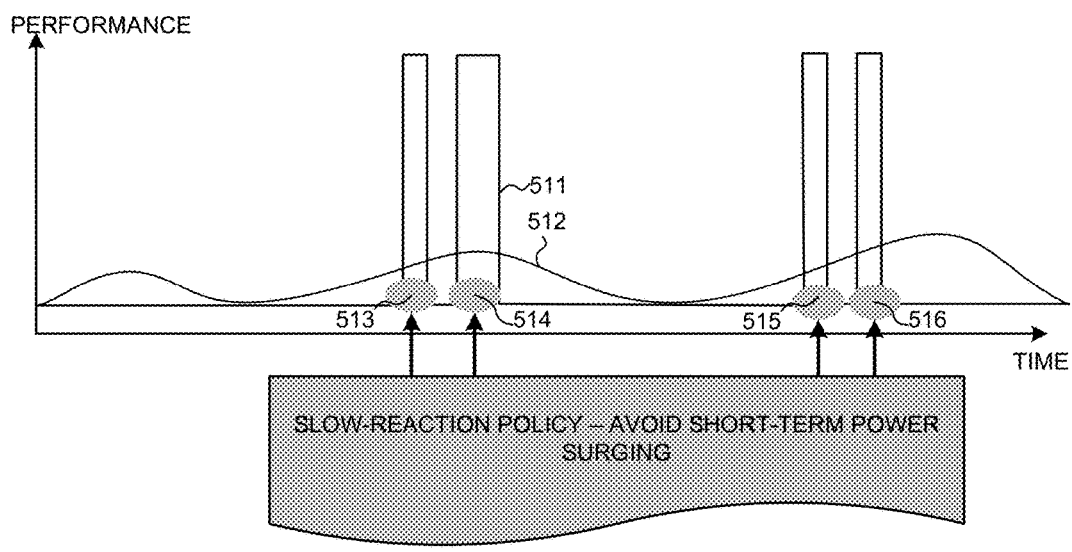
FIG. 5B illustrates an exemplary diagram of power control with automatically recognition of short-term high loading in accordance with embodiments of the current invention.

In one embodiment, long-term average values and/or short-term average values for thermal-performance parameters are obtained for scenario prediction. Based on detected workload and the long-term and/or short-term average workload, different policies can be applied for different scenario. FIGS. 5A and 5B show two exemplary scenarios.

FIG. 5A illustrates an exemplary diagram of power control with automatically recognition of short-term low loading in accordance with embodiments of the current invention. FIG. 5A illustrates a detected workload plot 501 and a corresponding long-term average plot 502. Plot 501 shows that at points 503, 504, 505 and 506, the performance requirement drops while during the rest of cycle, the performance keeps at a high level. The long-term average plot 502 gives additional information shows that the average performance level is high. Therefore, upon determining the short-term low loading scenario, the control loop can selects a fast-reaction policy. The fast-reaction policy will fast react to workload drop and immediately adjust the power level to gain power benefit during the short-term load dip.

FIG. 5B illustrates an exemplary diagram of power control with automatically recognition of short-term high loading in accordance with embodiments of the current invention. FIG. 5B illustrates a detected workload plot 511 and a corresponding long-term average plot 512. Plot 511 shows that at points 513, 514, 515 and 516, the performance requirement jumps while during the rest of cycle, the performance keeps at a low level. The long-term average plot 512 gives additional information shows that the average performance level is low. Therefore, upon determining the short-term high loading scenario, the control loop can selects a slow-reaction policy. The slow-reaction policy will slow react to workload jump and avoid short-term power surging due to the short-term load jump.

Figure 6A:
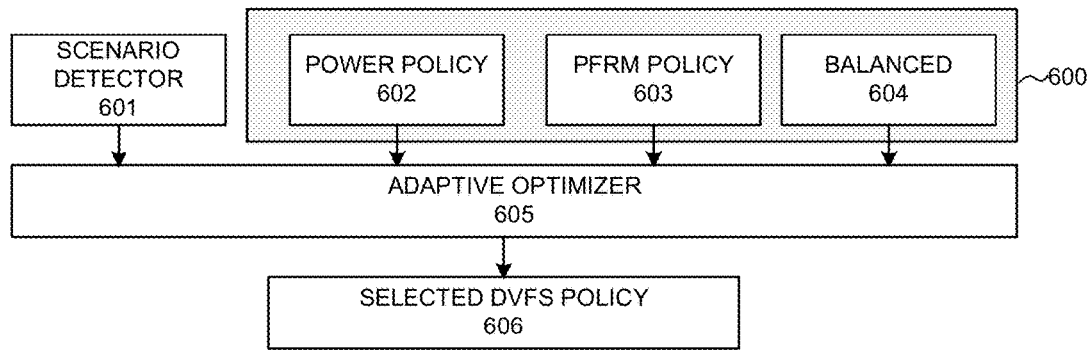
FIG. 6A illustrates an exemplary diagram of the DVFS policy selection based on detected scenario and user-defined preferences in accordance with embodiments of the current invention.
Figure 6B:
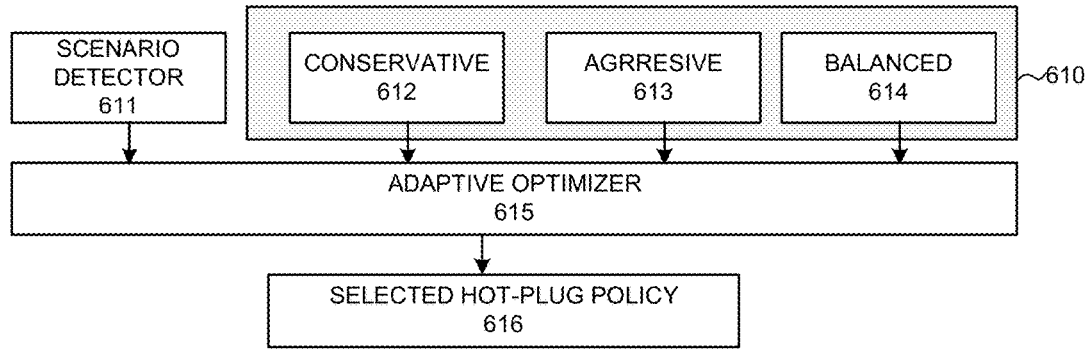
FIG. 6B illustrates an exemplary diagram of the CPU hot-plug policy selection based on detected scenario and user-defined preferences in accordance with embodiments of the current invention.
Figure 6C:
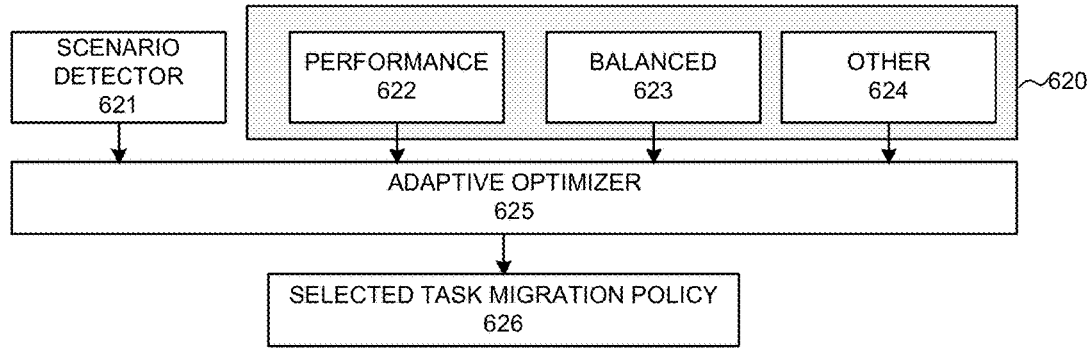
FIG. 6C illustrates an exemplary diagram of the task-migration policy selection based on detected scenario and user-defined preferences in accordance with embodiments of the current invention.

As shown above, the power control unit further detects thermal-performance parameters and obtains long-term and/or short-term average values of corresponding thermal-performance parameters. Based on the detected parameters and at least one of the long-term average value and the short-term average, a scenario predictor generates a scenario so that a better-adapted policy is selected. In one embodiment, the policy selection is further based on one or more user-defined preferences. FIGS. 6A, 6B, and 6C show exemplary diagrams for adaptive policy selection.

FIG. 6A illustrates an exemplary diagram of the DVFS policy selection based on detected scenario and user-defined preferences in accordance with embodiments of the current invention. A DVFS policy manager includes a scenario detector 601, a DVFS controller 600, an adaptive optimizer 605, and a DVFS policy selector 606. DVFS controller 600 is configured with different user-defined preferences. In one embodiment, the user-defined preferences include a power policy 602, a performance policy 603, and a balanced policy 604. In one embodiment, power policy 602 indicates higher weight on power saving. Performance policy 603 indicates higher weight on performance. Balanced policy 604 indicates a balanced policy between power and performance. Once configured, DVFS controller indicates to adaptive optimizer 605 which policy to choose. Adaptive optimizer 605 analyzes the inputs. DVFS policy selector 606 selects the best DVFS policy.

FIG. 6B illustrates an exemplary diagram of the CPU-hot-plug policy selection based on detected scenario and user-defined preferences in accordance with embodiments of the current invention. A CPU-hot-plug policy manager includes a scenario detector 611, a CPU-hot-plug controller 610, an adaptive optimizer 615, and a CPU-hot-plug policy selector 616. CPU-hot-plug controller 610 is configured with different user-defined preferences. In one embodiment, the user-defined preferences include a conservative policy 612, an aggressive policy 613, and a balanced policy 614. In one embodiment, conservative policy 612 indicates to adjust the operating frequency conservatively. Aggressive policy 613 indicates to adjust the operating frequency more aggressively. Balanced policy 614 indicates a balanced policy between the conservative and the aggressive. Once configured, CPU-hot-plug controller indicates to adaptive optimizer 615 which policy to choose. Adaptive optimizer 615 analyzes the inputs. CPU-hot-plug policy selector 616 selects the best CPU-hot-plug policy.

FIG. 6C illustrates an exemplary diagram of the task-migration policy selection based on detected scenario and user-defined preferences in accordance with embodiments of the current invention. A task-migration policy manager includes a scenario detector 621, a task-migration controller 620, an adaptive optimizer 625, and a task-migration policy selector 626. Task-migration controller 620 is configured with different user-defined preferences. In one embodiment, the user-defined preferences include a performance policy 622, a balanced policy 623, and other policies 624. In one embodiment, performance policy 622 indicates performance has higher weight in policy selection. Balanced policy 623 indicates a balanced policy between the conservative and the aggressive. Other policy 624 indicates other factors can be considered. Once configured, task-migration controller indicates to adaptive optimizer 625 which policy to choose. Adaptive optimizer 625 analyzes the inputs. Task-migration policy selector 626 selects the best task-migration policy.

Figure 7:
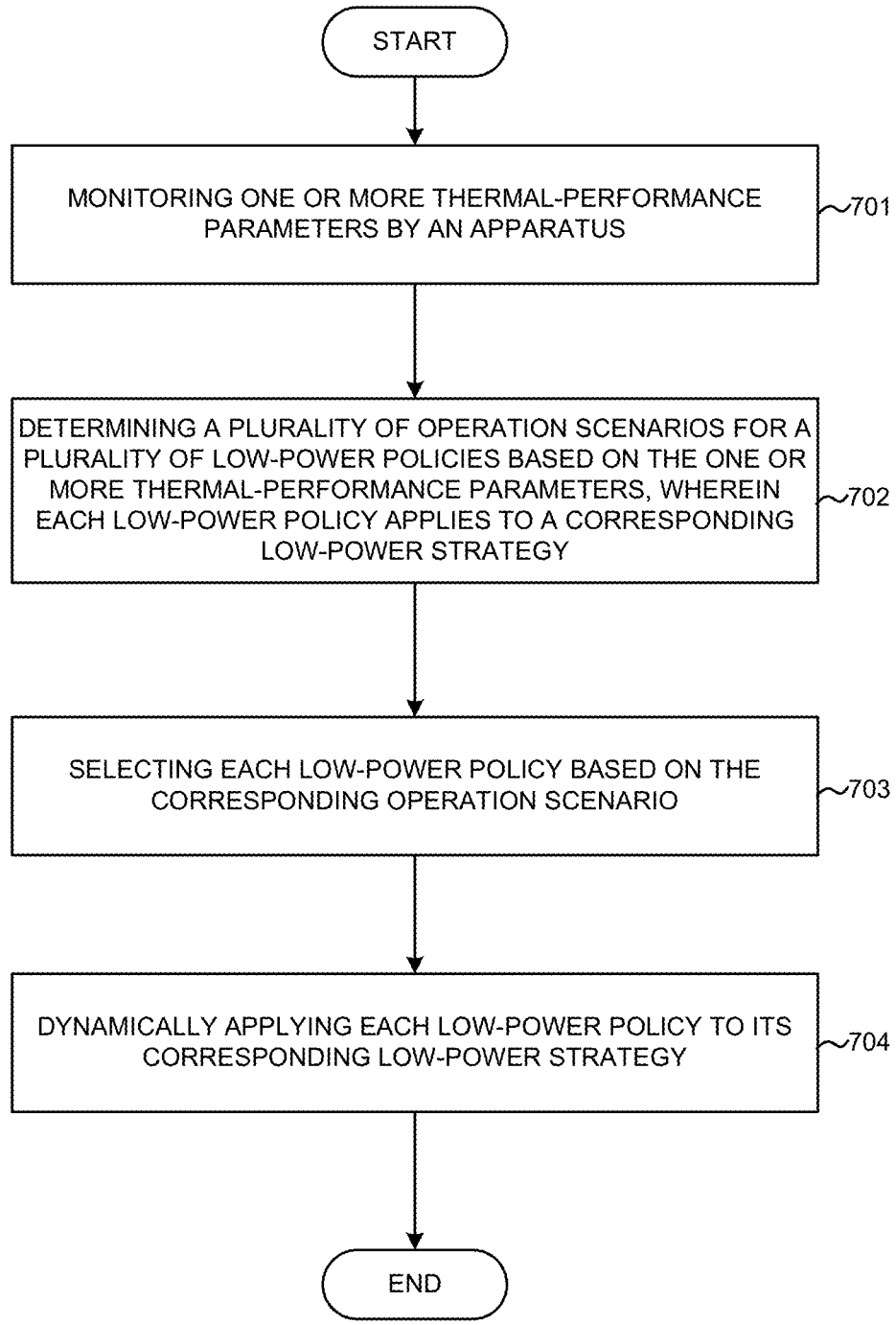
FIG. 7 illustrates an exemplary flow chart of an adaptive optimization of low power strategies in accordance with embodiments of the current invention.

FIG. 7 illustrates an exemplary flow chart of an adaptive optimization of low power strategies in accordance with embodiments of the current invention. At step 701, the device monitors one or more thermal-performance parameters. At step 702, the device determines a plurality of operation scenarios for a plurality of corresponding low-power policies based on the one or more thermal-performance parameters. At step 703, the device selects each low-power policy based on the corresponding operation scenario, wherein each low-power policy applies to a corresponding low-power strategy. At step 704, the device dynamically applies each low-power policy to its corresponding low-power strategy.

Although the present invention has been described in connection with certain specific embodiments for instructional purposes, the present invention is not limited thereto. For example, the device may determine the number of operating CPU cores based on the TLP and the operating frequency. In one embodiment, the number of operating CPU cores is increased when the TLP is higher than a threshold. In another embodiment, when the operating frequency is higher than a predefined threshold, the evaluation cycle is shortened for adjusting the number of CPU cores. Accordingly, various modifications, adaptations, and combinations of various features of the described embodiments can be practiced without departing from the scope of the invention as set forth in the claims.

What is claimed is:

1. A method, comprising:
   monitoring one or more thermal-performance parameters by an apparatus;
   determining a plurality of operation scenarios for a plurality of corresponding low-power policies based on the one or more thermal-performance parameters;

generating one or more long-term average values of the one or more thermal-performance parameters, and one or more short-term average values of the one or more thermal-performance parameters;

selecting each low-power policy based on the corresponding operation scenario, wherein each low-power policy applies to a corresponding low-power strategy, wherein the selecting of the plurality of low-power policies further comprising: obtaining a user-defined policy for each low-power strategy and selecting each low-power policy further based on corresponding user-defined policy; and dynamically applying each low-power policy to its corresponding low-power strategy, wherein the user-defined policy for a Dynamic Voltage and Frequency Scaling (DVFS) comprising: power policy, performance policy, and DVFS-balanced policy, and wherein the user-defined policy for a CPU hot-plug comprising: conservative policy, aggressive policy, and hot-plug-balanced policy, and wherein the user-defined policy for a task migration comprising: performance policy, and task-migration-balanced policy.

2. The method of claim 1, wherein the low-power strategies comprising: a Dynamic Voltage and Frequency Scaling (DVFS), a CPU hot-plug, and a task migration.

3. The method of claim 1, wherein the thermal-performance parameters comprising: a loading, a task-level parallelism (TLP), a number of CPU cores, and an operating frequency.

4. The method of claim 1, wherein the operation scenario is based on one or more long-term average values of the one or more thermal-performance parameters.

5. The method of claim 1, wherein the selection of each low-power policy is further based on the long-term average values, and the short-term average values.

6. The method of claim 1, wherein the long-term average loading value is high while one or more short term loading values are low, and wherein a fast-reaction policy is adopted by one or more low-power strategies.

7. The method of claim 1, wherein the long-term average loading value is low while one or more short term loading values are high, and wherein a slow-reaction policy is adopted by one or more low-power strategies.

8. An apparatus, comprising:
one or more sensors that monitor one or more thermal-performance parameters; and
a controller connected to the one or more sensors, the controller configured to
determine a plurality of operation scenarios for a plurality of low-power policies based on the one or more thermal-performance parameters, generate one or more long-term average values of the one or more thermal-performance parameters, and one or more short-term average values of the one or more thermal-performance parameters, select each low-power policy based on the corresponding operation scenario, wherein each low-power policy applies to a corresponding low-power strategy, and dynamically apply each low-power policy to its corresponding low-power strategy, wherein the selecting of the plurality of low-power policies further comprising: obtaining a user-defined policy for each low-power strategy and selecting each low-power policy further based on corresponding user-defined policy, and wherein the user-defined policy for a Dynamic Voltage and Frequency Scaling (DVFS) comprising: power policy, performance policy, and DVFS-balanced policy, and wherein the user-defined policy for a CPU hot-plug comprising: conservative policy, aggressive policy, and hot-plug-balanced policy, and wherein the user-defined policy for a task migration comprising: performance policy, and task-migration-balanced policy.

9. The apparatus of claim 8, wherein the low-power strategies comprising: a Dynamic Voltage and Frequency Scaling (DVFS), a CPU hot-plug, and a task migration.

10. The apparatus of claim 8, wherein the thermal-performance parameters comprising: a loading, a task-level parallelism (TLP), a number of CPU cores, and an operating frequency.

11. The apparatus of claim 8, wherein the operation scenario is based on one or more long-term average values of the one or more thermal-performance parameters.

12. The apparatus of claim 8, wherein the selection of each low-power policy is further based on the long-term average values, and the short-term average values.

13. The apparatus of claim 8, wherein the long-term average loading value is high while one or more short term loading values are low, and wherein a fast re-action policy is adopted by one or more low-power strategies.

14. The apparatus of claim 8, wherein the long-term average loading value is low while one or more short term loading values are high, and wherein a slow re-action policy is adopted by one or more low-power strategies.

15. An apparatus, comprising:
one or more sensors that monitor one or more thermal-performance parameters; and
a controller connected to the one or more sensors, the controller configured to determine a plurality of operation scenarios for a plurality of low-power policies based on the one or more thermal-performance parameters, generate a user-defined policy for each low-power strategy, select each low-power policy based on the corresponding operation scenario and corresponding user-defined policy, wherein each low-power policy applies to a corresponding low-power strategy, and wherein the user-defined policy for a Dynamic Voltage and Frequency Scaling (DVFS) comprising: power policy, performance policy, and DVFS-balanced policy, and wherein the user-defined policy for a CPU hot-plug comprising: conservative policy, aggressive policy, and hot-plug-balanced policy, and wherein the user-defined policy for a task migration comprising: performance policy, and task-migration-balanced policy, and
dynamically apply each low-power policy to its corresponding low-power strategy.

* * * * *